US012631951B2

(12) United States Patent
Wakabayashi et al.

(10) Patent No.: US 12,631,951 B2
(45) Date of Patent: May 19, 2026

(54) PROJECTOR WITH EXTENSION OPTICAL SYSTEM AND REDUCTION OPTICAL SYSTEM

(71) Applicant: SEIKO EPSON CORPORATION, Tokyo (JP)

(72) Inventors: Junichi Wakabayashi, Matsumoto (JP); Eiji Morikuni, Matsumoto (JP); Kana Hatano, Matsumoto (JP); Hidefumi Sakata, Azumino (JP); Takuo Yoneyama, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 272 days.

(21) Appl. No.: 18/586,792

(22) Filed: Feb. 26, 2024

(65) Prior Publication Data

US 2024/0288760 A1     Aug. 29, 2024

(30) Foreign Application Priority Data

Feb. 27, 2023     (JP) ................................. 2023-028135

(51) Int. Cl.
*G03B 21/20* (2006.01)
*G02B 27/10* (2006.01)
*G02B 27/12* (2006.01)
*G02B 27/14* (2006.01)

(52) U.S. Cl.
CPC ....... *G03B 21/2066* (2013.01); *G02B 27/102* (2013.01); *G02B 27/126* (2013.01); *G02B 27/141* (2013.01)

(58) Field of Classification Search
None
See application file for complete search history.

(56) References Cited

U.S. PATENT DOCUMENTS 7,159,988 B2    1/2007  Yatsu et al.
2005/0012870 A1*  1/2005  Hirata .................. H04N 9/3105
                                                    349/8
2005/0078387 A1*  4/2005  Maeda ................. H04N 9/3105
                                                    359/833

(Continued)

FOREIGN PATENT DOCUMENTS

JP      2005-157153 A    6/2005
JP      2005-345767 A    12/2005

(Continued)

*Primary Examiner* — James M Anderson, II
(74) *Attorney, Agent, or Firm* — Oliff PLC

(57) ABSTRACT

A projector includes a light source, a separation optical system including a first dichroic mirror for separating multicolored light into a first colored light beam as a blue light beam and another colored light beam, a first light modulation element for modulating the first colored light beam, a second light modulation element for modulating the other colored light beam, a reduction optical system for reducing a luminous flux width of the first colored light beam modulated by the first light modulation element, a color combining prism, and a projection optical system. The effective area of the first light modulation element is larger than the effective area of the second light modulation element. The separation optical system includes an extension optical system for extending a light path.

11 Claims, 4 Drawing Sheets

(56)                    References Cited

U.S. PATENT DOCUMENTS

| 2006/0044518 | A1* | 3/2006 | Allen | ..................... | G03B 33/12 |
| | | | | | 353/30 |
| 2012/0229715 | A1* | 9/2012 | Okumura | ............. | H04N 9/3105 |
| | | | | | 349/5 |
| 2016/0142686 | A1* | 5/2016 | Perkins | ................ | G02B 17/006 |
| | | | | | 348/758 |
| 2023/0074488 | A1 | 3/2023 | Wakabayashi | | |

FOREIGN PATENT DOCUMENTS

| JP | 2006-330410 A | 12/2006 |
| JP | 2022-038106 A | 3/2022 |
| JP | 2023-037782 A | 3/2023 |

* cited by examiner

PROJECTOR WITH EXTENSION OPTICAL SYSTEM AND REDUCTION OPTICAL SYSTEM

The present application is based on, and claims priority from JP Application Serial Number 2023-028135, filed Feb. 27, 2023, the disclosure of which is hereby incorporated by reference herein in its entirety.

BACKGROUND

1. Technical Field

The present disclosure relates to a projector.

2. Related Art

A projector in which liquid crystal in a liquid crystal device is prevented from deteriorating due to light from a light source is described in JP-A-2022-38106 (Document 1). The projector described in Document 1 is provided with a light source, a dichroic mirror for separating the light from the light source into three colored light beams, three transmissive liquid crystal light valves for respectively modulating the three colored light beams thus separated from each other, a cross dichroic prism for combining the light beams modulated by the liquid crystal light valves with each other, and a projection lens for projecting the light thus combined. In the projector described in Document 1, in the three liquid crystal light valves, the liquid crystal light valve for modulating the blue light beam is easier to be deteriorated by the light than other liquid crystal light valves for modulating the red light beam and the green light beam, and therefore, the liquid crystal light valve for modulating the blue light beam is provided with a plurality of liquid crystal reservoirs in a peripheral portion of an effective display area. Thus, since it is possible for the liquid crystal light valve for modulating the blue light beam to make the total amount of the liquid crystal in the liquid crystal light valve larger than in other liquid crystal light valves, it is possible to prevent the liquid crystal from being deteriorated by the light.

In recent years, a brighter projector is desired. However, in the projector described in Document 1, when raising the intensity of the light of the light source in order to make the projector brighter, there is a problem that it is difficult to prevent the deterioration of the liquid crystal in the liquid crystal light valve for modulating the blue light beam.

SUMMARY

In view of the problems described above, a projector according to the present disclosure includes a light source, a separation optical system including a first dichroic mirror configured to separate a multicolored light beam including a first colored light beam out of outgoing light emitted from the light source into the first colored light beam in a first wavelength band including blue light and another colored light beam longer in wavelength band than the first colored light beam, a first light modulation element configured to perform a modulation on the first colored light beam separated by the first dichroic mirror, a second light modulation element configured to perform a modulation on the other colored light beam separated by the first dichroic mirror, a reduction optical system having an expansion side imaging plane on which the first light modulation element is disposed, and configured to reduce a luminous flux width of the first colored light beam on a reduction side imaging plane, the first colored light beam being modulated by the first light modulation element, a color combining prism configured to emit a composite light beam obtained by combining the first colored light beam a luminous flux width of which is reduced by the reduction optical system, and the other colored light beam modulated by the second light modulation element with each other, and a projection optical system configured to project the composite light beam emitted from the color combining prism, wherein an effective area of the first light modulation element is larger than an effective area of the second light modulation element, the separation optical system includes an extension optical system configured to extend a light path, a first optical axis of the separation optical system and at least a part of a second optical axis of the reduction optical system are parallel to each other, the part of the second optical axis is perpendicular to a principal surface of a first surface part of the color combining prism which the first colored light beam enters, and when viewed from a direction perpendicular to the first optical axis and the part of the second optical axis, the extension optical system overlaps the reduction optical system.

DESCRIPTION OF EMBODIMENTS

Projectors according to some embodiments of the present disclosure will hereinafter be described with reference to the drawings.

Embodiment 1

Figure 1:
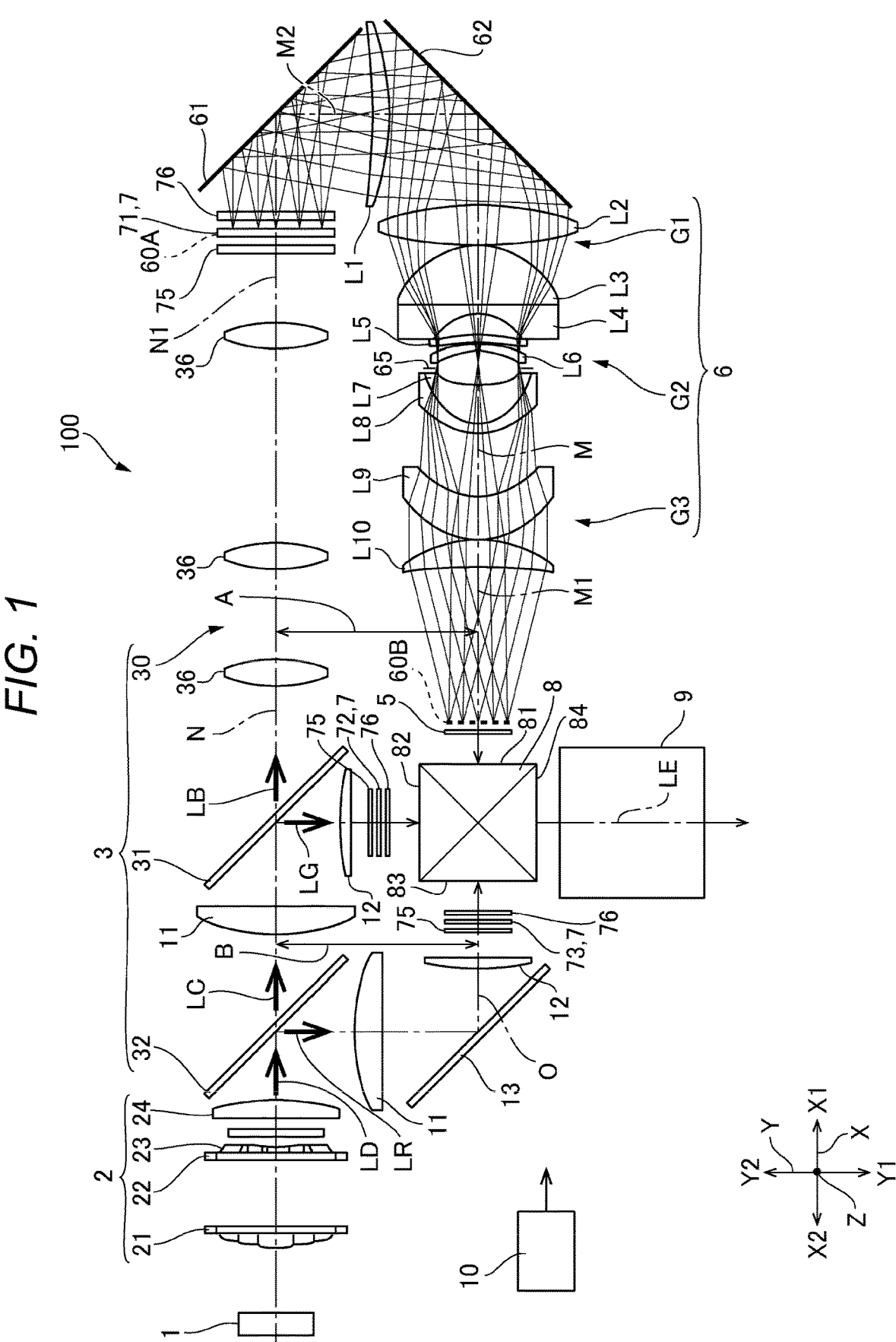
FIG. 1 is a schematic diagram of a relevant part of a projector according to Embodiment 1.

FIG. 1 is a schematic diagram of a relevant part of a projector 100 according to Embodiment 1. As shown in FIG. 1, the projector 100 has a light source 1, an illumination optical system 2 for homogenizing multicolored light from the light source 1, a separation optical system 3 for separating outgoing light from the illumination optical system 2 into colored light beams, a plurality of light modulation elements 7 for modulating the respective colored light beams separated by the separation optical system 3 to form projection images, a reduction optical system 6 for reducing a luminous flux width of the colored light beam modulated one of the light modulation elements 7, a color combining prism 8 for emitting a composite light beam obtained by combining the colored light beams modulated by the light modulation elements 7, a projection optical system 9 for projecting the composite light beam emitted from the color combining prism 8, and a controller 10 for controlling the light modulation elements 7.

Here, in the following description, three axes perpendicular to each other are defined as an X axis, a Y axis, and a Z axis for the sake of convenience. Further, a direction along a first optical axis N of the separation optical system 3 is defined as an X-axis direction. In the X-axis direction, a direction in which the outgoing light from the illumination optical system 2 is emitted is defined as a first direction X1, and an opposite direction to the first direction X1 is defined as a second direction X2. In the Y-axis direction, a direction in which the composite light beam is emitted from the color combining prism 8 is defined as a third direction Y1, and an opposite direction to the third direction Y1 is defined as a fourth direction Y2.

The light source 1 emits the multicolored light. The light source 1 is formed of, for example, a super-high pressure mercury lamp or a solid-state light source. In the present embodiment, the light source 1 emits white light, which is the multicolored light, as outgoing light LD. In the present embodiment, light intensities of the blue light beam, the green light beam, and the red light beam included in the outgoing light LD are equal to each other. It should be noted that the light intensities of the blue light beam, the green light beam, and the red light beam included in the outgoing light LD can be different from each other.

The illumination optical system 2 is provided with a multi-lens 21, a polarization beam splitter 22, a multi-lens 23, and a relay lens 24. The multi-lens 21 divides the outgoing light LD from the light source 1 into a plurality of parts. The polarization beam splitter 22 converts a polarization direction of the outgoing light LD emitted from the multi-lens 21. The multi-lens 23 converges the outgoing light LD emitted from the polarization beam splitter 22 on the vicinity of the relay lens 24. The relay lens 24 enlarges the outgoing light LD which enters the relay lens 24 from the multi-lens 23, and then emits the result toward the separation optical system 3.

The separation optical system 3 is provided with a second dichroic mirror 32, a first dichroic mirror 31, and an extension optical system 30 in this order toward the first direction X1. The second dichroic mirror 32, the first dichroic mirror 31, and the extension optical system 30 are arranged along the first optical axis N of the separation optical system 3. The second dichroic mirror 32 separates the outgoing light LD into a third colored light beam LR and a multicolored light beam LC. The second dichroic mirror 32 reflects the third colored light beam LR toward the third direction Y1, and transmits the multicolored light beam LC toward the first direction X1. The first dichroic mirror 31 separates the multicolored light beam LC into a first colored light beam LB and a second colored light beam LG (another colored light beam). The first dichroic mirror 31 reflects the second colored light beam LG toward the third direction Y1, and transmits the first colored light beam LB toward the first direction X1. In the present embodiment, the first colored light beam LB is in a first wavelength band including blue. The second colored light beam LG is in a second wavelength band including green. The third colored light beam LR is in a third wavelength band including red. The first wavelength band is in a range of, for example, 420 nm through 500 nm. The second wavelength band is in a range of, for example, 500 nm through 600 nm. The third wavelength band is in a range of, for example, 600 nm through 680 nm. The wavelength band of the multicolored light beam LC is, for example, 420 nm through 600 nm.

The extension optical system 30 extends a light path of the separation optical system 3 in the first direction X1. The extension optical system 30 is provided with a plurality of lenses 36. The plurality of lenses 36 is disposed along the first optical axis N of the separation optical system 3. The extension optical system 30 is disposed between the first dichroic mirror 31 and a first light modulation element 71 described later.

Here, at the third direction Y1 side of the second dichroic mirror 32, there is disposed a reflecting mirror 13 which reflects the third colored light beam LR separated by the second dichroic mirror 32, toward the first direction X1. Between the second dichroic mirror 32 and the reflecting mirror 13, and between the second dichroic mirror 32 and the first dichroic mirror 31, there are arranged lenses 11, respectively. At the first direction X1 side of the reflecting mirror 13 and the third direction Y1 side of the first dichroic mirror 31, there are arranged lenses 12, respectively. The lenses 11 and the lenses 12 each converge the second colored light beam LG and the third colored light beam LR separated by the separation optical system 3 on the vicinity of the light modulation elements 7, respectively.

The light modulation elements 7 are each a liquid crystal panel. The light modulation elements 7 include a first light modulation element 71 for performing the modulation on the first colored light beam LB, a third light modulation element 72 for performing the modulation on the second colored light beam LG, and a fourth light modulation element 73 for performing the modulation on the third colored light beam LR. The first light modulation element 71, the third light modulation element 72, and the fourth light modulation element 73 are each provided with an incidence side polarization plate 75 and an exit side polarization plate 76. It should be noted that the third light modulation element 72 and the fourth light modulation element 73 each correspond to a "second light modulation element" in the present disclosure.

The first light modulation element 71 is disposed at the first direction X1 side of the extension optical system 30. The optical axis N1 of the first light modulation element 71 coincides with the first optical axis N. The third light modulation element 72 is disposed at a position opposed to a second surface part 82 of the color combining prism 8. The fourth light modulation element 73 is disposed at a position opposed to a third surface part 83 of the color combining prism 8.

The effective area of the first light modulation element 71 is larger than the effective area of the third light modulation element 72 and the effective area of the fourth light modulation element 73. A diagonal dimension of the effective area (the effective display area) in the light modulation element in the present embodiment is 1.03 inch in the liquid crystal panel as the first light modulation element 71, and is 0.67 inch in the liquid crystal panels as the third light modulation element 72 and the fourth light modulation element 73. In the present embodiment, in the first light modulation element 71, the third light modulation element 72, and the fourth light modulation element 73, the display resolution is set to, for example, WUXGA (1920 pixels in the horizontal direction, 1200 pixels in the vertical direction).

The first light modulation element 71 is disposed on an expansion side imaging plane 60A of the reduction optical system 6, and the reduction optical system 6 reduces the luminous flux width of the first colored light beam LB modulated by the first light modulation element 71 on a reduction side imaging plane 60B. In the present embodiment, the reduction optical system 6 reduces the luminous flux width of 1.03 inch of the first colored light beam LB modulated by the first light modulation element 71 into the luminous flux width of 0.67 inch on the reduction side imaging plane 60B. The reduction side imaging plane 60B is disposed at a position opposed to a first surface part 81 of the color combining prism 8. The distance between the reduction side imaging plane 60B and the first surface part 81 of the color combining prism 8 is the same as the distance between the third light modulation element 72 and the second surface part 82 of the color combining prism 8.

Further, the distance between the reduction side imaging plane 60B and the first surface part 81 of the color combining prism 8 is the same as the distance between the fourth light modulation element 73 and the third surface part 83 of the color combining prism 8.

Here, the projector 100 has a polarization plate 5 arranged between the reduction side imaging plane 60B and the first surface part 81. The polarization plate 5 and the exit side polarization plate 76 of the first light modulation element 71 respectively transmit linearly-polarized components the same in direction out of the polarization components included in the first colored light beam LB. In other words, when the exit side polarization plate 76 of the first light modulation element 71 transmits S-polarized light of the first colored light beam LB, the polarization plate 5 transmits the S-polarized light, and when the exit side polarization plate 76 transmits P-polarized light of the first colored light beam LB, the polarization plate 5 transmits the P-polarized light.

The color combining prism 8 is provided with the first surface part 81 which the first colored light beam LB enters, the second surface part 82 which the second colored light beam LG enters, and the third surface part 83 which the third colored light beam LR enters, and a fourth surface part 84 from which the composite light beam LE is emitted. The first surface part 81 and the third surface part 83 are opposed in the X-axis direction to each other. The second surface part 82 and the fourth surface part 84 are opposed in the Y-axis direction to each other. The color combining prism 8 emits the composite light beam LE obtained by combining the first colored light beam LB the luminous flux width of which is reduced by the reduction optical system 6, the second colored light beam LG modulated by the third light modulation element 72, and the third colored light beam LR modulated by the fourth light modulation element 73 with each other, from the fourth surface part 84 toward the third direction Y1. Here, the luminous flux width of the first colored light beam LB entering the first surface part 81 of the color combining prism 8 is the same as the luminous flux width of the second colored light beam LG entering the second surface part 82 of the color combining prism 8, and the luminous flux width of the third colored light beam LR entering the third surface part 83 of the color combining prism 8.

The projection optical system 9 projects the composite light beam LE emitted from the color combining prism 8 on a screen. The projection optical system 9 is provided with a plurality of lenses. The controller 10 makes the light modulation elements 7 operate based on an external image signal such as a video signal.

Details of Reduction Optical System

As shown in FIG. 1, the reduction optical system 6 is provided with a first lens group G1, a second lens group G2, and a third lens group G3 in this order from the expansion side toward the reduction side, wherein the first lens group G1 is formed of a plurality of lenses, and has positive power, the second lens group G2 has negative power, and has a single lens or two lenses at least one of which is a negative lens, and the third lens group G3 is formed of a plurality of lenses, and has positive power. The reduction optical system 6 is provided with a diaphragm 65 between the second lens group G2 and the third lens group G3. The first lens group G1, the second lens group G2, and the third lens group G3 are arranged along a second optical axis M of the reduction optical system 6.

The number of the lenses of the first lens group G1 and the number of the lenses of the third lens group G3 are the same as each other. More specifically, the first lens group G1 includes four lenses, namely lenses L1 through L4. The third lens group G3 includes four lenses, namely lenses L7 through L10.

The second lens group G2 includes two lenses, namely a lens L5 and a lens L6. At least one of the lens L5 and the lens L6 is the negative lens. The lenses L2 through L10 are arranged in a part M1 extending in the X-axis direction of the second optical axis M. The lens L1 is disposed in another part M2 extending in the Y-axis direction of the second optical axis M.

The reduction optical system 6 is provided with a first reflecting mirror 61 for reflecting the first colored light beam LB modulated by the first light modulation element 71, toward the third direction Y1, and a second reflecting mirror 62 for reflecting the first colored light beam LB having been reflected by the first reflecting mirror 61, toward the second direction X2. The first reflecting mirror 61 is disposed at the fourth direction Y2 side of the lens L1. The second reflecting mirror 62 is disposed between the lens L1 and the lens L2.

Both sides of the reduction optical system 6, namely the expansion side of the first lens group G1, and the reduction side of the third lens group G3, are each telecentric. The expression that the expansion side of the first lens group G1 is telecentric means the state in which a central ray of the beams passing between the first lens group G1 and the expansion side imaging plane 60A is made parallel to the second optical axis M, or made substantially parallel to the second optical axis M. The expression that the reduction side of the third lens group G3 is telecentric means the state in which a central ray of the beams passing between the third lens group G3 and the reduction side imaging plane 60B is made parallel to the second optical axis M, or made substantially parallel to the second optical axis M. In the present embodiment, an angle between the central ray of the beams and the second optical axis M is within ±5°.

The first optical axis N of the separation optical system 3 and at least a part M1 of the second optical axis M of the reduction optical system 6 are parallel to each other. The part M1 of the second optical axis M is perpendicular to a principal surface of the first surface part 81 of the color combining prism 8 which the first colored light beam LB enters. When viewed from a direction perpendicular to the first optical axis N and the part M1 of the second optical axis M, the extension optical system 30 overlaps the reduction optical system 6.

In the Y-axis direction, the distance A between the first optical axis N and the part M1 of the second optical axis is the same as the distance B between the first optical axis N and an optical axis O of the third colored light beam LR which enters the third surface part 83.

Functions and Advantages

The projector 100 according to the present embodiment includes the light source 1, the separation optical system 3 provided with the first dichroic mirror 31 for separating the multicolored light beam LC including the first colored light beam LB out of the outgoing light LD emitted from the light source 1 into the first colored light beam LB in the first wavelength band including the blue light and the other colored light beam longer in wavelength band than the first colored light beam LB, the first light modulation element 71 for performing the modulation on the first colored light beam LB separated by the first dichroic mirror 31, the second light modulation element for performing the modulation on the other colored light beam separated by the first dichroic mirror 31, the reduction optical system 6 having the expansion side imaging plane 60A on which the first light modulation element 71 is disposed, and reducing the luminous flux width of the first colored light beam LB modulated by the first light modulation element 71 on the reduction side imaging plane 60B, the color combining prism 8 for emitting the composite light beam LE obtained by combining the first colored light beam LB the luminous flux width of which is reduced by the reduction optical system 6, and the other colored light beam modulated by the second light modulation element with each other, and the projection optical system 9 for projecting the composite light beam LE emitted from the color combining prism 8. The effective area of the first light modulation element 71 is larger than the effective area of the second light modulation element. The separation optical system 3 includes the extension optical system 30 for extending the light path. The first optical axis N of the separation optical system 3 and at least the part M1 of the second optical axis M of the reduction optical system 6 are parallel to each other. The part M1 of the second optical axis is perpendicular to the principal surface of the first surface part 81 of the color combining prism 8 which the first colored light beam LB enters. When viewed from the Y-axis direction, the extension optical system 30 overlaps the reduction optical system 6.

According to the present embodiment, since the effective area of the first light modulation element 71 is larger than the effective area of the second light modulation element, it is possible to make the illuminance of the first light modulation element 71 irradiated lower than the illuminance of the second light modulation element. Thus, it is possible to prevent the liquid crystal of the first light modulation element 71 from being deteriorated by the light even when making the light source 1 brighter.

Further, since it is possible for the reduction optical system 6 to reduce the luminous flux width of the first colored light beam LB modulated by the first light modulation element 71 on the reduction side imaging plane 60B, even when the effective area of the first light modulation element 71 is larger than the effective area of the third light modulation element 72, it is possible to make the luminous flux widths of the respective colored light beams entering the color combining prism 8 the same in size.

Further, since the separation optical system 3 includes the extension optical system 40 for extending the light path, it is possible to overlap the separation optical system 3 and the reduction optical system 6 in the Y-axis direction. Thus, it is possible to make the width of the projector 100 compact in the Y-axis direction.

In the present embodiment, the first dichroic mirror 31 transmits the first colored light beam LB in the first direction X1. The first light modulation element 71 is located at the first direction X1 side of the first dichroic mirror 31. The reduction optical system 6 is provided with the first reflecting mirror 61 for reflecting the first colored light beam LB modulated by the first light modulation element 71, toward the third direction Y1, and the second reflecting mirror 62 for reflecting the first colored light beam LB having been reflected by the first reflecting mirror 61, toward the second direction X2 opposite to the first direction X1. The extension optical system 30 is disposed between the first dichroic mirror 31 and the first light modulation element 71. Therefore, since the reduction optical system 6 is provided with the first reflecting mirror 61 and the second reflecting mirror 62, it is possible for the reduction optical system 6 to bend the first colored light beam LB emitted from the first light modulation element 71 to the first direction X1, toward the second direction X2. Thus, it is possible to overlap the separation optical system 3 and the reduction optical system 6 with each other in the Y-axis direction.

The projector 100 according to the present embodiment has the polarization plate 5 arranged between the reduction side imaging plane 60B and the first surface part 81. Therefore, even when the polarization direction of the first colored light beam LB is disturbed when the first colored light beam LB emitted from the first light modulation element 71 passes through the reduction optical system 6, it is possible for the polarization plate 5 to compensate the polarization direction of the first colored light beam LB. Thus, it is possible to prevent the contrast of the first colored light beam LB entering the color combining prism 8 from being lowered.

In the present embodiment, the separation optical system 3 is provided with the second dichroic mirror 32 for separating the outgoing light LD into the third colored light beam LR in the third wavelength band including red, and the multicolored light beam LC. The first dichroic mirror 31 separates the multicolored light beam LC separated by the second dichroic mirror 32 into the first colored light beam LB and the other colored light beam, namely the second colored light beam LG in the second wavelength band including green. The second light modulation element is provided with the third light modulation element 72 for performing the modulation on the second colored light beam LG separated by the first dichroic mirror 31, and the fourth light modulation element 73 for performing the modulation on the third colored light beam LR separated by the second dichroic mirror 32. The color combining prism 8 emits the composite light beam LE obtained by combining the first colored light beam LB the luminous flux width of which is reduced by the reduction optical system 6, the second colored light beam LG modulated by the third light modulation element 72, and the third colored light beam LR modulated by the fourth light modulation element 73 with each other. In this way, it is possible for the projector 100 to project the composite light beam LE as a full-color light beam.

The luminous flux width of the first colored light beam LB entering the first surface part 81 of the color combining prism 8 is the same as the luminous flux width of the second colored light beam LG entering the second surface part 82 of the color combining prism 8, and the luminous flux width of the third colored light beam LR entering the third surface part 83 of the color combining prism 8. Therefore, it is easy for the color combining prism 8 to combine the colored light beams with each other to form the single composite light beam LE.

In the present embodiment, the first surface part 81 and the third surface part 83 are opposed to each other in the X-axis direction, namely the direction along the part M1 of the second optical axis. In the Y-axis direction, the distance A between the first optical axis N and the part M1 of the second optical axis is the same as the distance B between the first optical axis N and the optical axis O of the third colored light beam LR which enters the third surface part 83. Therefore, growth in size in the Y-axis direction of the projector can be prevented.

In the present embodiment, the reduction optical system 6 is provided with the first lens group G1, the second lens group G2, and the third lens group G3 in this order from the expansion side toward the reduction side, wherein the first lens group G1 is formed of the plurality of lenses, and has positive power, the second lens group G2 has negative power, and has the two lenses at least one of which is a negative lens, and the third lens group G3 is formed of the plurality of lenses, and has positive power. The number of the lenses of the first lens group G1 and the number of the lenses of the third lens group G3 are the same as each other. The both sides of the reduction optical system 6 are each telecentric. Therefore, since the first lens group G1 and the third lens group G3 located across the second lens group G2 from each other are the same in the number of lenses, it is possible to cancel out a variety of aberrations generated in the first lens group G1 with the third lens group G3. Further, compared to a configuration in which the both sides of the reduction optical system 6 are not telecentric, the installation accuracy to the first light modulation element 71 is not so severe when incorporating the reduction optical system 6 into the projector 100. Further, since the first colored light beam LB proceeding from the reduction side imaging plane 60B toward the color combining prism 8 becomes a parallel light beam, it is easy to prevent the variety of aberrations to be generated in the reduction optical system 6 form being generated.

Further, since the reduction optical system 6 is formed of the plurality of lenses, it is easy to house the plurality of lenses in a lens tube. Therefore, when the plurality of lenses is housed in the lens tube, it becomes easy to incorporate the reduction optical system 6 into a projector main body, and therefore, it is possible to prevent a fluctuation when installing the reduction optical system 6.

The second reflecting mirror 62 is disposed between the lens L1 and the lens L2 of the first lens group G1. In this way, it is possible to arrange the lens L1 along the other part M2 perpendicular to the part M1 of the second optical axis, and therefore, it is possible to make the length in the X-axis direction of the reduction optical system 6 compact compared to when the lenses of the reduction optical system 6 are linearly arranged.

Embodiment 2

Figure 2:
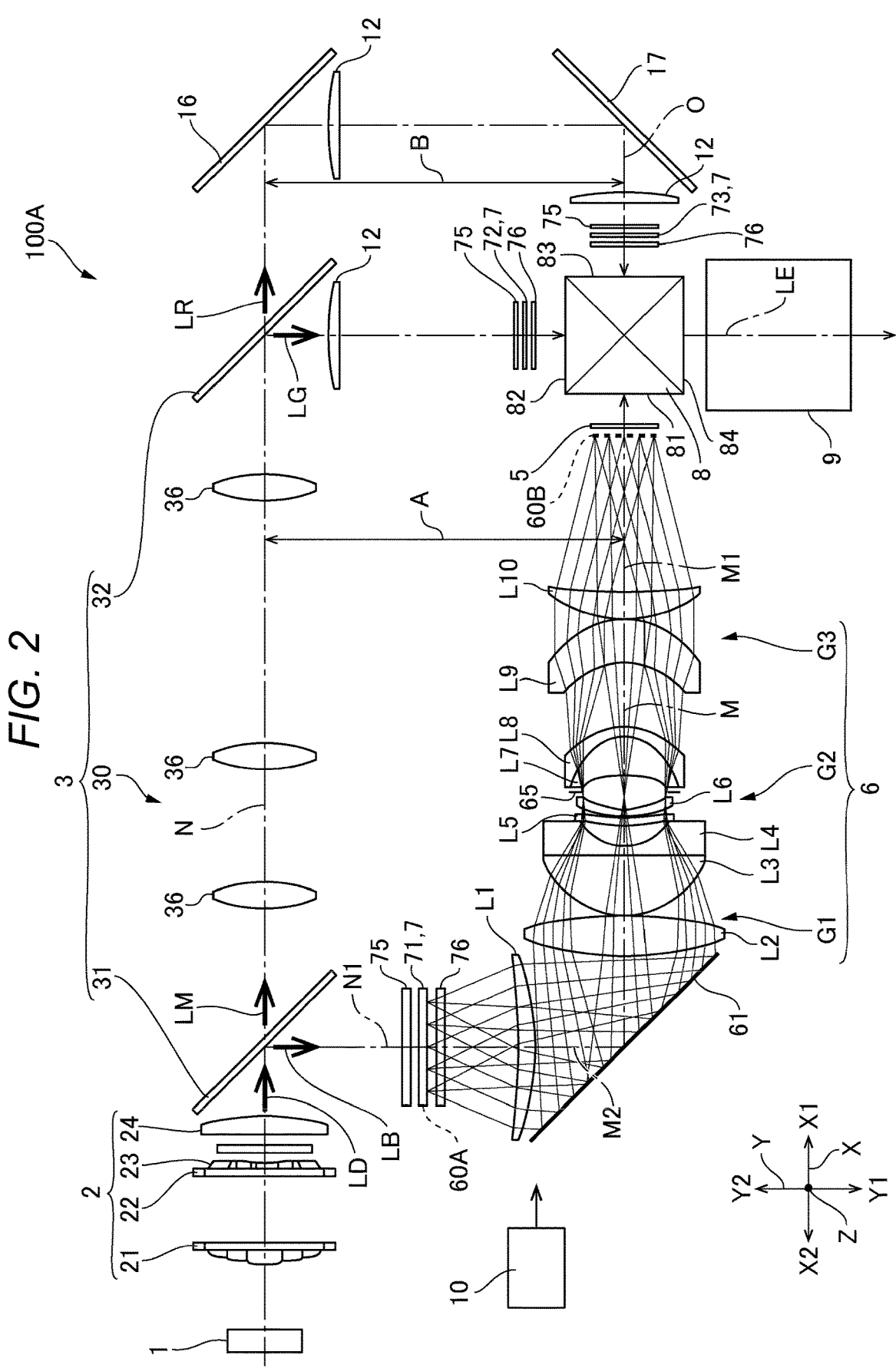
FIG. 2 is a schematic diagram of a relevant part of a projector according to Embodiment 2.

FIG. 2 is a schematic diagram of a relevant part of a projector 100A according to Embodiment 2. The projector 100A according to Embodiment 2 is different in configuration of the separation optical system 3 and the reduction optical system 6 from the projector 100 according to Embodiment 1. Therefore, in Embodiment 2, the same components as in Embodiment 1 are denoted by the same reference symbols to omit the description thereof in some cases.

The separation optical system 3 is provided with the first dichroic mirror 31, the extension optical system 30, and the second dichroic mirror 32 in this order toward the first direction X1. The first dichroic mirror 31, the extension optical system 30, and the second dichroic mirror 32 are arranged along the first optical axis N of the separation optical system 3. The first dichroic mirror 31 separates the outgoing light LD (the multicolored light) into the first colored light beam LB and another colored light beam LM. The first dichroic mirror 31 reflects the first colored light beam LB toward the third direction Y1, and transmits the other colored light beam LM toward the first direction X1. The second dichroic mirror 32 separates the other colored light beam LM into the second colored light beam LG and the third colored light beam LR. The second dichroic mirror 32 reflects the second colored light beam LG toward the third direction Y1, and transmits the third colored light beam LR toward the first direction X1. In the present embodiment, the first colored light beam LB is in the first wavelength band including blue. The second colored light beam LG is in the second wavelength band including green. The third colored light beam LR is in the third wavelength band including red. The first wavelength band is in a range of, for example, 420 nm through 500 nm. The second wavelength band is in a range of, for example, 500 nm through 600 nm. The third wavelength band is in a range of, for example, 600 nm through 680 nm. The wavelength band of the other colored light beam LM is in a range of, for example, 500 nm through 680 nm.

The extension optical system 30 is provided with the plurality of lenses 36. The plurality of lenses 36 is disposed along the first optical axis N of the separation optical system 3. The extension optical system 30 is disposed between the first dichroic mirror 31 and the second dichroic mirror 32.

Here, at the first direction X1 side of the second dichroic mirror 32, there is disposed a reflecting mirror 16 which reflects the third colored light beam LR separated by the second dichroic mirror 32, toward the third direction Y1. At the third direction Y1 side of the reflecting mirror 16, there is disposed a reflecting mirror 17 which reflects the third colored light beam LR having been reflected by the reflecting mirror 16, toward the second direction X2. At the third direction Y1 side of the second dichroic mirror 32, and the second direction X2 side of the reflecting mirror 17, there are arranged the lenses 12, respectively. The lenses 12 each converge the second colored light beam LG and the third colored light beam LR separated by the separation optical system 3 on the vicinity of the light modulation elements 7, respectively.

The first light modulation element 71 is disposed at the third direction Y1 side of the first dichroic mirror 31. The optical axis N1 of the first light modulation element 71 extends in a direction along the Y axis. The third light modulation element 72 is disposed at a position opposed to the second surface part 82 of the color combining prism 8. The fourth light modulation element 73 is disposed at a position opposed to the third surface part 83 of the color combining prism 8.

The effective area of the first light modulation element 71 is larger than the effective area of the third light modulation element 72 and the effective area of the fourth light modulation element 73. A diagonal dimension of the effective area (the effective display area) in an optical element in the present embodiment is 1.03 inch in the liquid crystal panel as the first light modulation element 71, and is 0.67 inch in the liquid crystal panels as the third light modulation element 72 and the fourth light modulation element 73. In the first light modulation element 71, the third light modulation element 72, and the fourth light modulation element 73, the display resolution is set to, for example, WUXGA (1920 pixels in the horizontal direction, 1200 pixels in the vertical direction).

Here, the projector 100A has the polarization plate 5 arranged between the reduction side imaging plane 60B and the first surface part 81. The polarization plate 5 and the exit side polarization plate 76 of the first light modulation element 71 respectively transmit linearly-polarized components the same in direction out of the polarization components included in the first colored light beam LB.

The luminous flux width of the first colored light beam LB entering the first surface part 81 of the color combining prism 8 is the same as the luminous flux width of the second colored light beam LG entering the second surface part 82 of the color combining prism 8, and the luminous flux width of the third colored light beam LR entering the third surface part 83 of the color combining prism 8.

Details of Reduction Optical System

As shown in FIG. 2, the reduction optical system 6 is provided with the first lens group G1, the second lens group G2, and the third lens group G3 in this order from the expansion side toward the reduction side, wherein the first lens group G1 is formed of a plurality of lenses, and has positive power, the second lens group G2 has negative power, and has a single lens or two lenses at least one of which is a negative lens, and the third lens group G3 is formed of a plurality of lenses, and has positive power. The reduction optical system 6 is provided with the diaphragm 65 between the second lens group G2 and the third lens group G3. The first lens group G1, the second lens group G2, and the third lens group G3 are arranged along the second optical axis M of the reduction optical system 6.

The first lens group G1 includes the four lenses, namely the lenses L1 through L4. The second lens group G2 includes the two lenses, namely the lens L5 and the lens L6. At least one of the lens L5 and the lens L6 is the negative lens. The third lens group G3 includes the four lenses, namely the lenses L7 through L10. The lenses L2 through L10 are arranged in the part M1 extending in the X-axis direction of the second optical axis M. The lens L1 is disposed in the other part M2 extending in the Y-axis direction of the second optical axis M.

The reduction optical system 6 is provided with the first reflecting mirror 61 which reflects the first colored light beam LB modulated by the first light modulation element 71 toward the first direction X1. The first reflecting mirror 61 is disposed between the lens L1 and the lens L2.

The expansion side of the first lens group G1 and the reduction side of the third lens group G3 are each telecentric.

The first optical axis N of the separation optical system 3 and at least the part M1 of the second optical axis M of the reduction optical system 6 are parallel to each other. The part M1 of the second optical axis M is perpendicular to the principal surface of the first surface part 81 of the color combining prism 8 which the first colored light beam LB enters. When viewed from a direction perpendicular to the first optical axis N and a part M1 of the second optical axis M, the extension optical system 30 overlaps the reduction optical system 6.

In the Y-axis direction, the distance A between the first optical axis N and the part M1 of the second optical axis is the same as the distance B between the first optical axis N and the optical axis O of the third colored light beam LR which enters the third surface part 83.

Functions and Advantages

In the present embodiment, the first dichroic mirror 31 reflects the first colored light beam LB toward the third direction Y1. The first light modulation element 71 is located at the third direction Y1 side of the first dichroic mirror 31. The reduction optical system 6 is provided with the first reflecting mirror 61 which reflects the first colored light beam LB modulated by the first light modulation element 71 toward the first direction X1. The extension optical system 30 is disposed at the first direction X1 side of the first dichroic mirror 31. Therefore, since the reduction optical system 6 is provided with the first reflecting mirror 61, it is possible to overlap the separation optical system 3 and the reduction optical system 6 with each other in the Y-axis direction.

In the present embodiment, the separation optical system 3 is provided with the second dichroic mirror 32 for separating the other colored light beam LM, which has been separated by the first dichroic mirror 31, into the second colored light beam LG in the second wavelength band including green, and the third colored light beam LR in the third wavelength band including red. The second light modulation element is provided with the third light modulation element 72 for performing the modulation on the second colored light beam LG separated by the second dichroic mirror 32, and the fourth light modulation element 73 for performing the modulation on the third colored light beam LR separated by the second dichroic mirror 32. The color combining prism 8 emits the composite light beam LE obtained by combining the first colored light beam LB the luminous flux width of which is reduced by the reduction optical system 6, the second colored light beam LG modulated by the third light modulation element 72, and the third colored light beam LR modulated by the fourth light modulation element 73 with each other. In this way, it is possible for the projector 100A to project the composite light beam LE as a full-color light beam.

The first reflecting mirror 61 is disposed between the lens L1 and the lens L2 of the first lens group G1. In this way, it is possible to arrange the lens L1 along the other part M2 perpendicular to the part M1 of the second optical axis, and therefore, it is possible to make the length in the X-axis direction of the reduction optical system 6 compact compared to when the lenses of the reduction optical system 6 are linearly arranged.

In Embodiment 2, regarding the configuration substantially the same as that of Embodiment 1, it is possible to obtain substantially the same functions and advantages as those of Embodiment 1.

Embodiment 3

Figure 3:
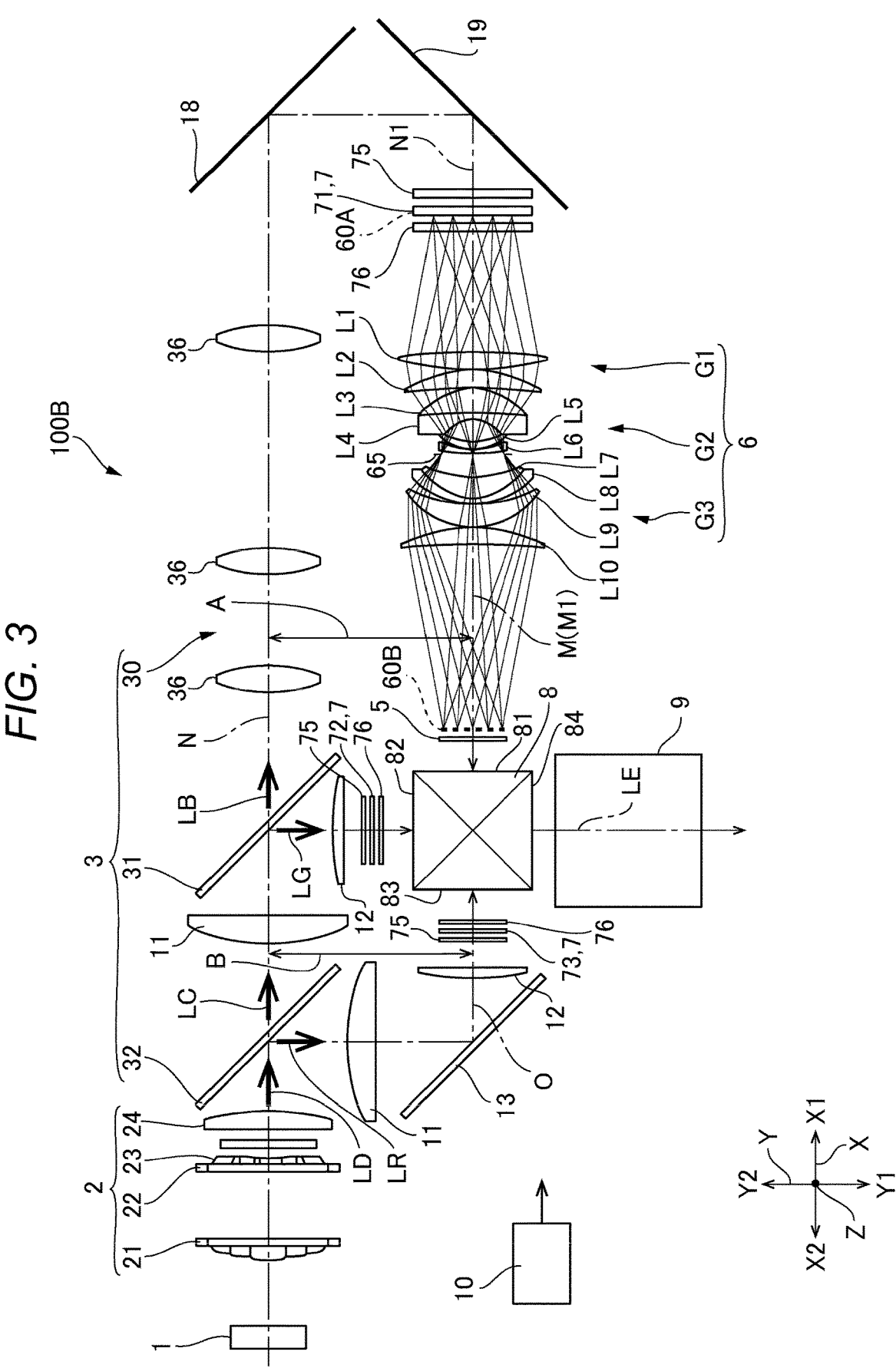
FIG. 3 is a schematic diagram of a relevant part of a projector according to Embodiment 3.

FIG. 3 is a schematic diagram of a relevant part of a projector 100B according to Embodiment 3. The projector 100B according to Embodiment 3 is different in configuration of the reduction optical system 6 from the projector 100 according to Embodiment 1. Therefore, in Embodiment 3, the same components as in Embodiment 1 are denoted by the same reference symbols to omit the description thereof in some cases.

The projector 100B has a first reflecting mirror 18 for reflecting the first colored light beam LB which has been transmitted by the first dichroic mirror 31 toward the first direction X1, and a second reflecting mirror 19 for reflecting the first colored light beam LB which has been reflected by the first reflecting mirror 18, toward the second direction X2. The first reflecting mirror 18 is disposed at the first direction X1 side of the extension optical system 30. The second reflecting mirror 19 is disposed at the third direction Y1 side of the first reflecting mirror 18.

The first light modulation element 71 is disposed at the second direction X2 side of the second reflecting mirror 19. The optical axis N1 of the first light modulation element 71 extends in a direction along the X axis. The third light modulation element 72 is disposed at a position opposed to the second surface part 82 of the color combining prism 8. The fourth light modulation element 73 is disposed at a position opposed to the third surface part 83 of the color combining prism 8.

The effective area of the first light modulation element 71 is larger than the effective area of the third light modulation element 72 and the effective area of the fourth light modulation element 73. A diagonal dimension of the effective area (the effective display area) in the light modulation element in the present embodiment is 1.03 inch in the liquid crystal panel as the first light modulation element 71, and is 0.67 inch in the liquid crystal panels as the third light modulation element 72 and the fourth light modulation element 73. In the first light modulation element 71, the third light modulation element 72, and the fourth light modulation element 73, the display resolution is set to, for example, WUXGA (1920 pixels in the horizontal direction, 1200 pixels in the vertical direction).

The projector 100B has the polarization plate 5 arranged between the reduction side imaging plane 60B and the first surface part 81. The polarization plate 5 and the exit side polarization plate 76 of the first light modulation element 71 respectively transmit linearly-polarized components the same in direction out of the polarization components included in the first colored light beam LB.

The luminous flux width of the first colored light beam LB entering the first surface part 81 of the color combining prism 8 is the same as the luminous flux width of the second colored light beam LG entering the second surface part 82 of the color combining prism 8, and the luminous flux width of the third colored light beam LR entering the third surface part 83 of the color combining prism 8.

Details of Reduction Optical System

As shown in FIG. 3, the reduction optical system 6 is provided with the first lens group G1, the second lens group G2, and the third lens group G3 in this order from the expansion side toward the reduction side, wherein the first lens group G1 is formed of a plurality of lenses, and has positive power, the second lens group G2 has negative power, and has a single lens or two lenses at least one of which is a negative lens, and the third lens group G3 is formed of a plurality of lenses, and has positive power. The reduction optical system 6 is provided with the diaphragm 65 between the second lens group G2 and the third lens group G3. The first lens group G1, the second lens group G2, and the third lens group G3 are arranged along the second optical axis M of the reduction optical system 6.

The first lens group G1 includes the four lenses, namely the lenses L1 through L4. The second lens group G2 includes the two lenses, namely the lens L5 and the lens L6. At least one of the lens L5 and the lens L6 is the negative lens. The third lens group G3 includes the four lenses, namely the lenses L7 through L10. The whole of the second optical axis M including the part M1 extending in the X-axis direction extends linearly along the X axis. The lenses L1 through L10 are arranged on the second optical axis M.

The expansion side of the first lens group G1 and the reduction side of the third lens group G3 are each telecentric.

The first optical axis N of the separation optical system 3 and the second optical axis M of the reduction optical system 6 are parallel to each other. The second optical axis M is perpendicular to the principal surface of the first surface part 81 of the color combining prism 8 which the first colored light beam LB enters. When viewed from a direction perpendicular to the first optical axis N and the second optical axis M, the extension optical system 30 overlaps the reduction optical system 6.

In the Y-axis direction, the distance A between the first optical axis N and the second optical axis M is the same as the distance B between the first optical axis N and the optical axis O of the third colored light beam LR which enters the third surface part 83.

Functions and Advantages

In the present embodiment, the first dichroic mirror 31 transmits the first colored light beam LB in the first direction X1. The projector 100B has the first reflecting mirror 18 for reflecting the first colored light beam LB which has been transmitted by the first dichroic mirror 31, toward the third direction Y1, and the second reflecting mirror 19 for reflecting the first colored light beam LB which has been reflected by the first reflecting mirror 18, toward the second direction X2 opposite to the first direction X1. The first light modulation element 71 is located at the second direction X2 side of the second reflecting mirror 19. The extension optical system 30 is disposed between the first dichroic mirror 31 and the first reflecting mirror 18. The second optical axis M linearly extends. Therefore, since the projector 100B is provided with the first reflecting mirror 18 and the second reflecting mirror 19, it is possible to overlap the separation optical system 3 and the reduction optical system 6 with each other in the Y-axis direction. In this case, since the second optical axis M of the reduction optical system 6 linearly extends, it is easy to arrange the reduction optical system 6.

In Embodiment 3, regarding the configuration substantially the same as that of Embodiment 1, it is possible to obtain substantially the same functions and advantages as those of Embodiment 1.

Embodiment 4

Figure 4:
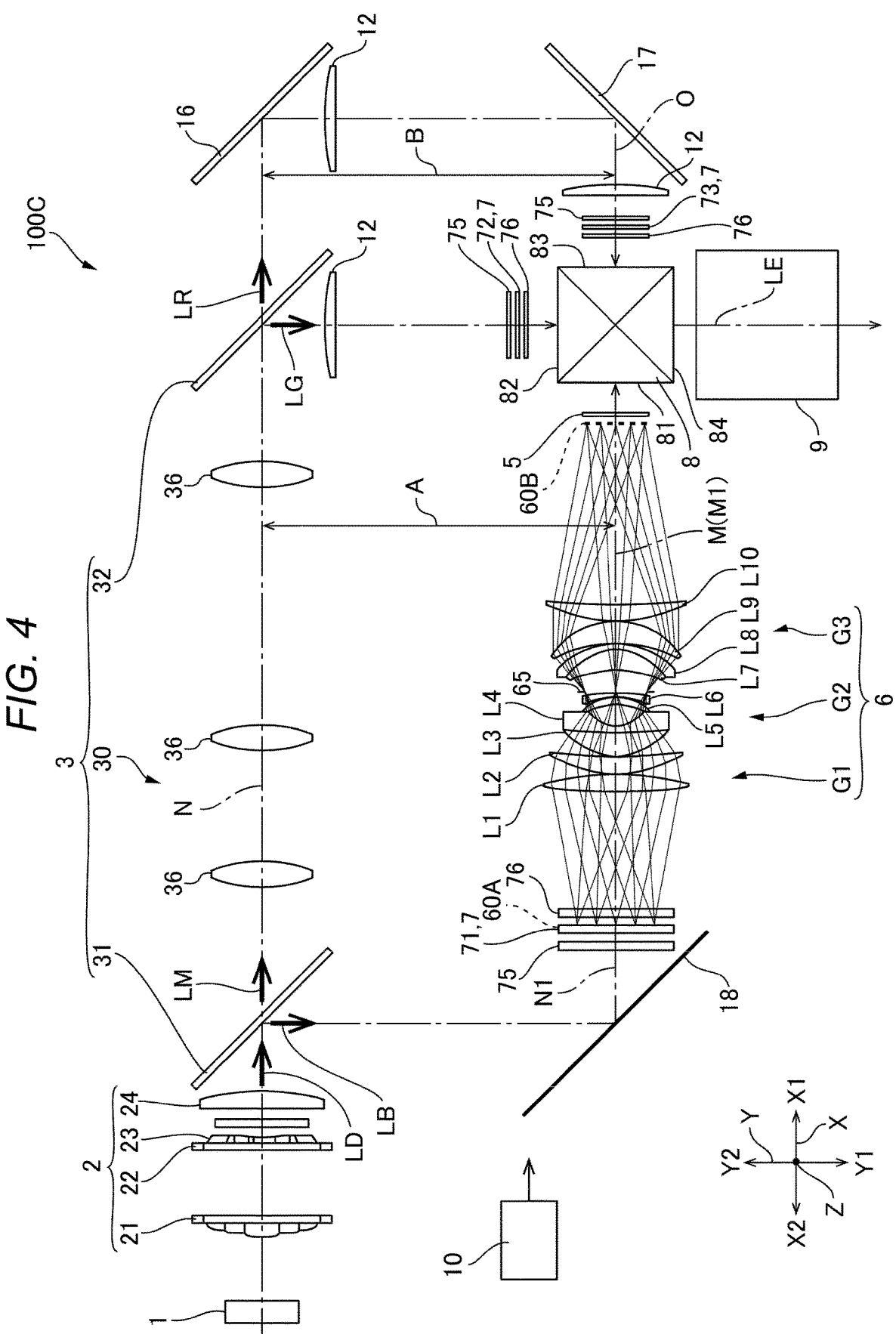
FIG. 4 is a schematic diagram of a relevant part of a projector according to Embodiment 4.

FIG. 4 is a schematic diagram of a relevant part of a projector 100C according to Embodiment 4. The projector 100C according to Embodiment 4 is different in configuration of the reduction optical system 6 from the projector 100A according to Embodiment 2. Therefore, in Embodiment 4, the same components as in Embodiment 1 are denoted by the same reference symbols to omit the description thereof in some cases.

The projector 100C has the first reflecting mirror 18 for reflecting the first colored light beam LB which has been reflected by the first dichroic mirror 31 toward the third direction Y1, toward the first direction X1. The first reflecting mirror 18 is disposed at the third direction Y1 side of the first dichroic mirror 31.

The first light modulation element 71 is disposed at the first direction X1 side of the first reflecting mirror 18. The optical axis N1 of the first light modulation element 71 extends in a direction along the X axis. The third light modulation element 72 is disposed at a position opposed to the second surface part 82 of the color combining prism 8. The fourth light modulation element 73 is disposed at a position opposed to the third surface part 83 of the color combining prism 8.

The effective area of the first light modulation element 71 is larger than the effective area of the third light modulation element 72 and the effective area of the fourth light modulation element 73. A diagonal dimension of the effective area (the effective display area) in the light modulation element in the present embodiment is 1.03 inch in the liquid crystal panel as the first light modulation element 71, and is 0.67 inch in the liquid crystal panels as the third light modulation element 72 and the fourth light modulation element 73. In all of the first light modulation element 71, the third light modulation element 72, and the fourth light modulation element 73, the display resolution is set to, for example, WUXGA (1920 pixels in the horizontal direction, 1200 pixels in the vertical direction).

Here, the projector 100C has the polarization plate 5 arranged between the reduction side imaging plane 60B and the first surface part 81. The polarization plate 5 and the exit side polarization plate 76 of the first light modulation element 71 respectively transmit linearly-polarized compo-
nents the same in direction out of the polarization compo-
nents included in the first colored light beam LB.

The luminous flux width of the first colored light beam LB
entering the first surface part 81 of the color combining
prism 8 is the same as the luminous flux width of the second
colored light beam LG entering the second surface part 82
of the color combining prism 8, and the luminous flux width
of the third colored light beam LR entering the third surface
part 83 of the color combining prism 8.

Details of Reduction Optical System

As shown in FIG. 4, the reduction optical system 6 is
provided with the first lens group G1, the second lens group
G2, and the third lens group G3 in this order from the
expansion side toward the reduction side, wherein the first
lens group G1 is formed of a plurality of lenses, and has
positive power, the second lens group G2 has negative
power, and has a single lens or two lenses at least one of
which is a negative lens, and the third lens group G3 is
formed of a plurality of lenses, and has positive power. The
reduction optical system 6 is provided with the diaphragm
65 between the second lens group G2 and the third lens
group G3. The first lens group G1, the second lens group G2,
and the third lens group G3 are arranged along the second
optical axis M of the reduction optical system 6.

The first lens group G1 includes the four lenses, namely
the lenses L1 through L4. The second lens group G2
includes the two lenses, namely the lens L5 and the lens L6.
At least one of the lens L5 and the lens L6 is the negative
lens. The third lens group G3 includes the four lenses,
namely the lenses L7 through L10. The whole of the second
optical axis M including the part M1 extending in the X-axis
direction extends linearly along the X axis. The lenses L1
through L10 are arranged on the second optical axis M.

The expansion side of the first lens group G1 and the
reduction side of the third lens group G3 are each telecentric.

The first optical axis N of the separation optical system 3
and the second optical axis M of the reduction optical system
6 are parallel to each other. The second optical axis M is
perpendicular to the principal surface of the first surface part
81 of the color combining prism 8 which the first colored
light beam LB enters. When viewed from a direction per-
pendicular to the first optical axis N and the second optical
axis M, the extension optical system 30 overlaps the reduc-
tion optical system 6.

In the Y-axis direction, the distance A between the first
optical axis N and the second optical axis M is the same as
the distance B between the first optical axis N and the optical
axis O of the third colored light beam LR which enters the
third surface part 83.

Functions and Advantages

In the present embodiment, the first dichroic mirror 31
reflects the first colored light beam LB toward the third
direction Y1. The projector 100C has the first reflecting
mirror 18 for reflecting the first colored light beam LB which
has been reflected by the first dichroic mirror 31, toward the
first direction X1. The extension optical system 30 is dis-
posed at the first direction X1 side of the first dichroic mirror
31. The second optical axis M linearly extends. Therefore,
since the projector 100C is provided with the first reflecting
mirror 18, it is possible to overlap the separation optical
system 3 and the reduction optical system 6 with each other
in the Y-axis direction. In this case, since the second optical
axis M of the reduction optical system 6 linearly extends, it
is easy to arrange the reduction optical system 6.

In Embodiment 4, regarding the configuration substan-
tially the same as that of Embodiment 1, it is possible to
obtain substantially the same functions and advantages as
those of Embodiment 1.

Conclusion of Present Disclosure

Hereinafter, the conclusion of the present disclosure will
supplementarily be noted.

Supplementary Note 1

A projector including a light source, a separation optical
system including a first dichroic mirror configured to sepa-
rate a multicolored light beam including a first colored light
beam out of outgoing light emitted from the light source into
the first colored light beam in a first wavelength band
including blue light and another colored light beam longer in
wavelength band than the first colored light beam, a first
light modulation element configured to perform a modula-
tion on the first colored light beam separated by the first
dichroic mirror, a second light modulation element config-
ured to perform a modulation on the other colored light
beam separated by the first dichroic mirror, a reduction
optical system having an expansion side imaging plane on
which the first light modulation element is disposed, and
configured to reduce a luminous flux width of the first
colored light beam on a reduction side imaging plane, the
first colored light beam being modulated by the first light
modulation element, a color combining prism configured to
emit a composite light beam obtained by combining the first
colored light beam a luminous flux width of which is
reduced by the reduction optical system, and the other
colored light beam modulated by the second light modula-
tion element with each other, and a projection optical system
configured to project the composite light beam emitted from
the color combining prism, wherein an effective area of the
first light modulation element is larger than an effective area
of the second light modulation element, the separation
optical system includes an extension optical system config-
ured to extend a light path, a first optical axis of the
separation optical system and at least a part of a second
optical axis of the reduction optical system are parallel to
each other, the part of the second optical axis is perpendicu-
lar to a principal surface of a first surface part of the color
combining prism which the first colored light beam enters,
and when viewed from a direction perpendicular to the first
optical axis and the part of the second optical axis, the
extension optical system overlaps the reduction optical
system.

Thus, since the effective area of the first light modulation
element is larger than the effective area of the second light
modulation element, it is possible to make the illuminance
of the first light modulation element irradiated lower than
the illuminance of the second light modulation element. As
a result, it is possible to prevent the liquid crystal in the first
light modulation element from being deteriorated by the
light.

Further, since it is possible for the reduction optical
system to reduce the luminous flux width of the first colored
light beam modulated by the first light modulation element
on the reduction side imaging plane, even when the effective
area of the first light modulation element is larger than the
effective area of the second light modulation element, it is
possible to make the luminous flux widths of the respective
colored light beams entering the color combining prism the
same in size.

Further, since the separation optical system includes the extension optical system for extending the light path, the extension optical system overlaps the reduction optical system when viewed from the direction perpendicular to the first optical axis and the part of the second optical axis, and therefore, it is possible to make the width of the projector compact in the perpendicular direction.

Supplementary Note 2

The projector described in Supplementary Note 1, wherein the first dichroic mirror is configured to transmit the first colored light beam in a first direction of the first optical axis, the first light modulation element is located at the first direction side of the first dichroic mirror, the reduction optical system includes a first reflecting mirror configured to reflect the first colored light beam modulated by the first light modulation element, toward a third direction perpendicular to the first optical axis, and a second reflecting mirror configured to reflect the first colored light beam reflected by the first reflecting mirror, toward a second direction opposite to the first direction of the first optical axis, and the extension optical system is disposed between the first dichroic mirror and the first light modulation element.

Thus, it is possible for the reduction optical system to bend the first colored light beam emitted to the first direction from the first light modulation element, toward the second direction. As a result, it is possible to overlap the separation optical system and the reduction optical system with each other in the perpendicular direction.

Supplementary Note 3

The projector described in Supplementary Note 1, wherein the first dichroic mirror is configured to reflect the first colored light beam toward a third direction perpendicular to the first optical axis, the first light modulation element is located at the third direction side of the first dichroic mirror, the reduction optical system includes a first reflecting mirror configured to reflect the first colored light beam modulated by the first light modulation element toward a first direction of the first optical axis perpendicular to the third direction, and the extension optical system is disposed at the first direction side of the first dichroic mirror.

Thus, it is possible to overlap the separation optical system and the reduction optical system with each other in the perpendicular direction.

Supplementary Note 4

The projector described in Supplementary Note 1 further including a first reflecting mirror configured to reflect the first colored light beam which is transmitted by the first dichroic mirror in a first direction of the first optical axis, toward a third direction perpendicular to the first optical axis, and a second reflecting mirror configured to reflect the first colored light beam which is reflected by the first reflecting mirror, toward a second direction opposite to the first direction of the first optical axis, wherein the first light modulation element is located at the second direction side of the second reflecting mirror, the extension optical system is disposed between the first dichroic mirror and the first reflecting mirror, and the second optical axis linearly extends.

Thus, it is possible to overlap the separation optical system and the reduction optical system with each other in the perpendicular direction. Further, since the second optical axis of the reduction optical system linearly extends, it is easy to arrange the reduction optical system.

Supplementary Note 5

The projector described in Supplementary Note 1 further including a first reflecting mirror configured to reflect the first colored light beam which is reflected by the first dichroic mirror toward a third direction perpendicular to the first optical axis, toward a first direction of the first optical axis perpendicular to the third direction, wherein the extension optical system is disposed at the first direction side of the first dichroic mirror, and the second optical axis linearly extends.

Thus, it is possible to overlap the separation optical system and the reduction optical system with each other in the perpendicular direction. Further, since the second optical axis of the reduction optical system linearly extends, it is easy to arrange the reduction optical system.

Supplementary Note 6

The projector described in any one of Supplementary Note 1 through Supplementary Note 5, further including a polarization plate arranged between the reduction side imaging plane and the first surface part.

Thus, it is possible to prevent the contrast of the first colored light beam entering the color combining prism from being lowered.

Supplementary Note 7

The projector described in any one of Supplementary Note 1 through Supplementary Note 5, wherein the separation optical system includes a second dichroic mirror configured to separate the outgoing light into a third colored light beam in a third wavelength band including red, and the multicolored light beam, the first dichroic mirror is configured to separate the multicolored light beam separated by the second dichroic mirror, into the first colored light beam and a second colored light beam in a second wavelength band including green as the other colored light beam, the second light modulation element includes a third light modulation element configured to perform a modulation on the second colored light beam separated by the first dichroic mirror, and a fourth light modulation element configured to perform a modulation on the third colored light beam separated by the second dichroic mirror, and the color combining prism is configured to emit a composite light beam obtained by combining the first colored light beam the luminous flux width of which is reduced by the reduction optical system, the second colored light beam modulated by the third light modulation element, and the third colored light beam modulated by the fourth light modulation element with each other.

Thus, it is possible for the projector to project the composite light beam as a full-color light beam.

Supplementary Note 8

The projector described in any one of Supplementary Note 1 through Supplementary Note 5, wherein the separation optical system includes a second dichroic mirror configured to separate the other colored light beam separated by the first dichroic mirror, into a second colored light beam in a second wavelength band including green, and a third colored light beam in a third wavelength band including red, the second light modulation element includes a third light modulation element configured to perform a modulation on the second colored light beam separated by the second dichroic mirror, and a fourth light modulation element configured to perform a modulation on the third colored light beam separated by the second dichroic mirror, and the color combining prism is configured to emit a composite light beam obtained by combining the first colored light beam the luminous flux width of which is reduced by the reduction optical system, the second colored light beam modulated by the third light modulation element, and the third colored light beam modulated by the fourth light modulation element with each other.

Thus, it is possible for the projector to project the composite light beam as a full-color light beam.

Supplementary Note 9

The projector described in one of Supplementary Note 7 and Supplementary Note 8, wherein the first colored light beam entering the first surface part of the color combining prism, the second colored light beam entering a second surface part of the color combining prism, and the third colored light beam entering a third surface part of the color combining prism are same in luminous flux width as each other.

Thus, it is easy for the color combining prism to combine the colored light beams with each other to form the single composite light beam.

Supplementary Note 10

The projector described in Supplementary Note 9, wherein the first surface part and the third surface part are opposed to each other in a direction along the part of the second optical axis, and a distance between the first optical axis and the part of the second optical axis is same as a distance between the first optical axis and an optical axis of the third colored light beam entering the third surface part in the perpendicular direction.

Thus, it is possible to prevent the projector from growing in size in the perpendicular direction.

Supplementary Note 11

The projector described in any one of Supplementary Note 1 through Supplementary Note 10, wherein the reduction optical system includes a first lens group, a second lens group, and a third lens group in this order from an expansion side toward a reduction side, wherein the first lens group is formed of a plurality of lenses, and has positive power, the second lens group has negative power, and has a single lens or two lenses at least one of which is a negative lens, and the third lens group is formed of a plurality of lenses, and has positive power, the first lens group and the third lens group are same in number of lenses as each other, and both sides of the reduction optical system are each telecentric.

Thus, since the first lens group and the third lens group located across the second lens group from each other are the same in the number of lenses, it is possible to cancel out a variety of aberrations generated in the first lens group with the third lens group. Further, compared to a configuration in which the both sides of the reduction optical system are not telecentric, the installation accuracy to the first light modulation element is not so severe when incorporating the reduction optical system into the projector. Further, since the first colored light beam proceeding from the reduction side imaging plane toward the color combining prism becomes a parallel light beam, it is easy to prevent the variety of aberrations to be generated in the reduction optical system form being generated.

What is claimed is:

1. A projector comprising:

a light source;

a separation optical system including a first dichroic mirror configured to separate a multicolored light beam including a first colored light beam out of outgoing light emitted from the light source into the first colored light beam in a first wavelength band including blue light and another colored light beam longer in wavelength band than the first colored light beam;

a first light modulation element configured to perform a modulation on the first colored light beam separated by the first dichroic mirror;

a second light modulation element configured to perform a modulation on the other colored light beam separated by the first dichroic mirror;

a reduction optical system having an expansion side imaging plane on which the first light modulation element is disposed, and configured to reduce a luminous flux width of the first colored light beam on a reduction side imaging plane, the first colored light beam being modulated by the first light modulation element;

a color combining prism configured to emit a composite light beam obtained by combining the first colored light beam a luminous flux width of which is reduced by the reduction optical system, and the other colored light beam modulated by the second light modulation element with each other; and a projection optical system configured to project the composite light beam emitted from the color combining prism, wherein an effective area of the first light modulation element is larger than an effective area of the second light modulation element, the separation optical system includes an extension optical system configured to extend a light path, a first optical axis of the separation optical system and at least a part of a second optical axis of the reduction optical system are parallel to each other, the part of the second optical axis is perpendicular to a principal surface of a first surface part of the color combining prism which the first colored light beam enters, and when viewed from a direction perpendicular to the first optical axis and the part of the second optical axis, the extension optical system overlaps the reduction optical system.

2. The projector according to claim 1, wherein the first dichroic mirror is configured to transmit the first colored light beam in a first direction of the first optical axis, the first light modulation element is located at the first direction side of the first dichroic mirror, the reduction optical system includes a first reflecting mirror configured to reflect the first colored light beam modulated by the first light modulation element, toward a third direction perpendicular to the first optical axis, and a second reflecting mirror configured to reflect the first colored light beam reflected by the first reflecting mirror, toward a second direction opposite to the first direction of the first optical axis, and the extension optical system is disposed between the first dichroic mirror and the first light modulation element.

3. The projector according to claim 1, wherein
the first dichroic mirror is configured to reflect the first
colored light beam toward a third direction perpendicu-
lar to the first optical axis,
the first light modulation element is located at the third
direction side of the first dichroic mirror,
the reduction optical system includes a first reflecting
mirror configured to reflect the first colored light beam
modulated by the first light modulation element toward
a first direction of the first optical axis perpendicular to
the third direction, and
the extension optical system is disposed at the first
direction side of the first dichroic mirror.
4. The projector according to claim 1, further comprising:
a first reflecting mirror configured to reflect the first
colored light beam which is transmitted by the first
dichroic mirror in a first direction of the first optical
axis, toward a third direction perpendicular to the first
optical axis; and
a second reflecting mirror configured to reflect the first
colored light beam which is reflected by the first
reflecting mirror, toward a second direction opposite to
the first direction of the first optical axis, wherein
the first light modulation element is located at the second
direction side of the second reflecting mirror,
the extension optical system is disposed between the first
dichroic mirror and the first reflecting mirror, and
the second optical axis linearly extends.
5. The projector according to claim 1, further comprising:
a first reflecting mirror configured to reflect the first
colored light beam which is reflected by the first
dichroic mirror toward a third direction perpendicular
to the first optical axis, toward a first direction of the
first optical axis perpendicular to the third direction,
wherein
the extension optical system is disposed at the first
direction side of the first dichroic mirror, and
the second optical axis linearly extends.
6. The projector according to claim 1, further comprising:
a polarization plate arranged between the reduction side
imaging plane and the first surface part.
7. The projector according to claim 1, wherein
the separation optical system includes a second dichroic
mirror configured to separate the outgoing light into a
third colored light beam in a third wavelength band
including red, and the multicolored light beam,
the first dichroic mirror is configured to separate the
multicolored light beam separated by the second
dichroic mirror, into the first colored light beam and a
second colored light beam in a second wavelength band
including green as the other colored light beam,
the second light modulation element includes a third light
modulation element configured to perform a modula-
tion on the second colored light beam separated by the
first dichroic mirror, and a fourth light modulation
element configured to perform a modulation on the
third colored light beam separated by the second
dichroic mirror, and
the color combining prism is configured to emit a com-
posite light beam obtained by combining the first
colored light beam the luminous flux width of which is reduced by the reduction optical system, the second
colored light beam modulated by the third light modu-
lation element, and the third colored light beam modu-
lated by the fourth light modulation element with each
other.
8. The projector according to claim 1, wherein
the separation optical system includes a second dichroic
mirror configured to separate the other colored light
beam separated by the first dichroic mirror, into a
second colored light beam in a second wavelength band
including green, and a third colored light beam in a
third wavelength band including red,
the second light modulation element includes a third light
modulation element configured to perform a modula-
tion on the second colored light beam separated by the
second dichroic mirror, and a fourth light modulation
element configured to perform a modulation on the
third colored light beam separated by the second
dichroic mirror, and
the color combining prism is configured to emit a com-
posite light beam obtained by combining the first
colored light beam the luminous flux width of which is
reduced by the reduction optical system, the second
colored light beam modulated by the third light modu-
lation element, and the third colored light beam modu-
lated by the fourth light modulation element with each
other.
9. The projector according to claim 7, wherein
the first colored light beam entering the first surface part
of the color combining prism, the second colored light
beam entering a second surface part of the color
combining prism, and the third colored light beam
entering a third surface part of the color combining
prism are same in luminous flux width as each other.
10. The projector according to claim 9, wherein
the first surface part and the third surface part are opposed
to each other in a direction along the part of the second
optical axis, and
a distance between the first optical axis and the part of the
second optical axis is same as a distance between the
first optical axis and an optical axis of the third colored
light beam entering the third surface part in the per-
pendicular direction.
11. The projector according to claim 1, wherein
the reduction optical system includes a first lens group, a
second lens group, and a third lens group in this order
from an expansion side toward a reduction side,
wherein the first lens group is formed of a plurality of
lenses, and has positive power, the second lens group
has negative power, and has a single lens or two lenses
at least one of which is a negative lens, and the third
lens group is formed of a plurality of lenses, and has
positive power,
the first lens group and the third lens group are same in
number of lenses as each other, and
both sides of the reduction optical system are each tele-
centric.

* * * * *